United States Patent [19]

Bargain et al.

[11] 4,138,543

[45] Feb. 6, 1979

[54] POLYMERIZATION OF ORGANOPOLYSILOXANES

[75] Inventors: Michel Bargain, Lyon; Claude Millet, Saint-Priest, both of France

[73] Assignee: Rhone-Poulenc Industries, Paris, France

[21] Appl. No.: 800,391

[22] Filed: May 25, 1977

[30] Foreign Application Priority Data

May 31, 1976 [FR] France .............................. 76 17170

[51] Int. Cl.² ........................................... C08G 77/04
[52] U.S. Cl. ............................. 528/14; 260/448.2 E; 528/21; 528/23; 528/32; 528/37; 528/38; 528/42; 528/43
[58] Field of Search .................... 260/46.5 R, 46.5 G, 260/448.2 E

[56] References Cited

U.S. PATENT DOCUMENTS

| 3,305,524 | 2/1967 | Brown, Jr. et al. ................. 260/46.5 |
| 3,477,988 | 11/1969 | Ostrozynski ........................ 260/46.5 |
| 3,890,278 | 6/1975 | Lehn et al. .......................... 260/63 R |
| 4,028,338 | 6/1977 | Razzano ............................... 260/46.5 |

FOREIGN PATENT DOCUMENTS 2310372 12/1976 France.

OTHER PUBLICATIONS

Boileau et al., Journal of Polymer Science (Polymer Letters Edition), vol. 12, pp. 217–220, 1974.
Lehn et al., Tetrahedron, vol. 29, 1629–1645 (1973).
Lehn et al., Tetrahedron, 29, 1647–1658 (1973).

*Primary Examiner*—Melvyn I. Marquis
*Attorney, Agent, or Firm*—Bacon & Thomas

[57] ABSTRACT

Organopolysiloxanes are polymerized in the presence of an alkaline catalyst and a complex oxygen, sulfur or nitrogen heterocyclic compound.

22 Claims, No Drawings

POLYMERIZATION OF ORGANOPOLYSILOXANES

BACKGROUND OF THE INVENTION

1. Field of the Invention

The present invention relates to a process for the preparation of high molecular weight organopolysiloxanes by polymerization and rearrangement of low molecular weight organopolysiloxane compounds, especially those which are cyclic.

2. Description of the Prior Art

It is known to the art that it is possible to polymerize and to rearrange low molecular weight organopolysiloxanes in order to convert them into high molecular weight products by using basic catalysts, such as, for example, alkali metal hydroxides, alkali metal silanolates and alcoholates, or quaternary ammonium hydroxides (NOLL — *Chemistry and Technology of Silicones* — 1968 Ed. p. 206). Various techniques have been proposed with a view towards speeding up the polymerization rate, for example, via the use of nitrites or amides (French Pat. Nos. 1,354,443 an 1,359,414). It has also been proposed to associate an aminophosphine oxide (French Pat. No. 1,474,899), or a complex of an alkali metal with a triaminophosphine oxide (French Pat. No. 1,474,900), with the basic catalyst.

Additionally, Boileau et al. have shown (*POLYMER LETTERS*, 12, p. 217-220 — 1974) that it was possible to rapidly polymerize hexamethylcyclotrisiloxane, in the presence of potassium hydroxide complexed with a macroheterobicyclic ether (complexes termed cryptates). Boileau et al. have carried out the reaction in benzene, using a large quantity of alkaline catalyst and of "cryptate", relative to the quantity of cyclic siloxane employed.

SUMMARY OF THE INVENTION

It has now been found that it is possible to speed up, very substantially, the bulk polymerization of low molecular weight siloxanes, in the presence of a small quantity of an alkaline catalyst, by associating a monocyclic or polycyclic macrocyclic compound with the alkaline catalyst. More precisely, the subject of the invention is a process for the preparation of high molecular weight organopolysiloxanes by polymerization of siloxanes which consist of at least 50% by weight of cyclic siloxanes of the formula (A)

$$\mathrm{+R_1R_2Si-O+_n}$$

in which the symbol "n" represents an integer which is at least equal to 4, the symbol "$R_1$" represents a hydrocarbon radical containing 1 to 12 carbon atoms, which may be unsubstituted or substituted by one or more atoms or radicals such as halogen atoms, amino groups or cyano groups, and the symbol "$R_2$" represents a radical such as defined for "$R_1$", or an —$OR_3$ group, "$R_3$" being a hydrogen atom or a radical such as "$R_1$", this process being characterized in that the polymerization is carried out in bulk, in the presence of:

(a) 0.005 to 1 millimol of an alkaline catalyst per 100 grams of siloxane, and (b) from 0.05 to 5 mols, per mol of alkaline catalyst, of a monocyclic or polycyclic compound, or mixture of such compounds, comprising at least three atoms or groups of atoms selected from among —O—, —S—,

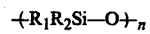

or —NH— and from 9 to 60 carbon atoms, the atoms or groups mentioned above being connected together via hydrocarbon groups which comprise at least two carbon atoms.

DETAILED DESCRIPTION OF THE INVENTION

The cyclic compounds mentioned above can contain one type of heteroatom only (O, S or N); or, alternatively, can also contain two or three types of heteroatoms. Among these compounds, there may specially be mentioned the monocyclic polyethers (I) of the formula

in which "a" is a number from 3 to 20, and the symbol "R" represents a —$CH_2$—$CH_2$— or —$CH_2$—$CH_2$—$CH_2$— radical or a radical selected from among the

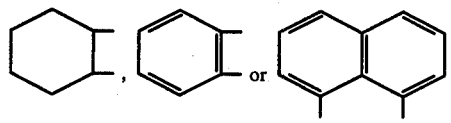

radicals, it being possible for the said cyclic radicals to be substituted, especially by an alkyl radical having up to 12 carbon atoms, the number of units in which "R" represents one of the above-mentioned cyclic radicals preferably being, at the most, equal to 2 in the macrocyclic polyether. These cyclic polyethers are usually termed crown-ethers.

The cyclic compound can also be a monocyclic polythioether (II) of the formula

in which "a" is a number from 3 to 20 and "R" represents a —$CH_2$—$CH_2$— or —$CH_2$—$CH_2$—$CH_2$— radical or a radical selected from among the

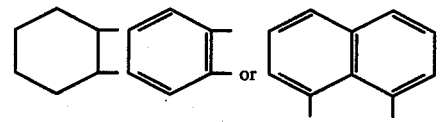

radicals, which may be substituted with an alkyl radical having up to 12 carbon atoms, the number of units in which "R" represents one of the cyclical radicals being no greater than 2.

The cyclic compound can also be a monocyclic polyamine (III) containing from 4 to 8 N atoms or NH groups, connected especially by —$CH_2$—$CH_2$—, —$CH_2$—$CH_2$—$CH_2$— or —CH—CH—CH— radicals.

The cyclic compound can also be selected from among the monocyclic or polycyclic compounds (IV) containing at least two different types of atoms or groups chosen from among —O—, —S— and —NH—, connected by —R— radicals, with "R" having the meaning indicated above, and the total number of these atoms or groups being at most equal to 8.

The cyclic compound can also be selected from among the nitrogen-containing bicyclic compounds (V) corresponding to the general formula

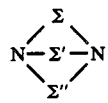

in which the symbols $\Sigma$, $\Sigma'$ and $\Sigma''$, which may be identical or different, represent groups of the formula $\pm R'-T\!\rightarrow_p R'-$, where T represents $-O-$ or $-S-$, p is equal to 1, 2 or 3 and R′ represents a $-CH_2-CH_2-$ group, it being possible, in addition, for T to represent a valence bond in one of the bridges represented by the symbols $\Sigma$, $\Sigma'$ and $\Sigma''$, and it also being possible, alternatively, for R′ to represent, once, a

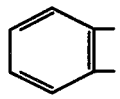

radical in one or two of these bridges.

By way of specific examples of cyclic compounds belonging to the groups defined above, there may be mentioned the products whose formulae are indicated below:

Group I

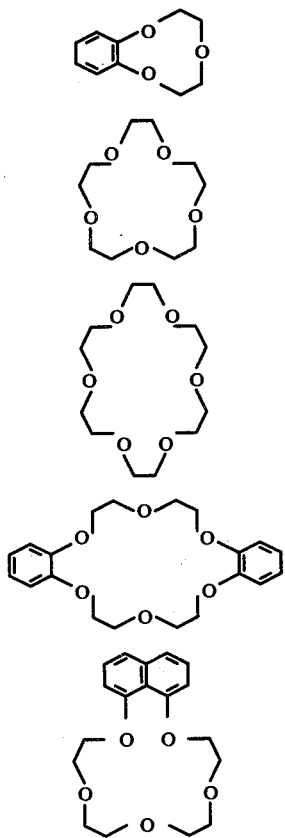

-continued

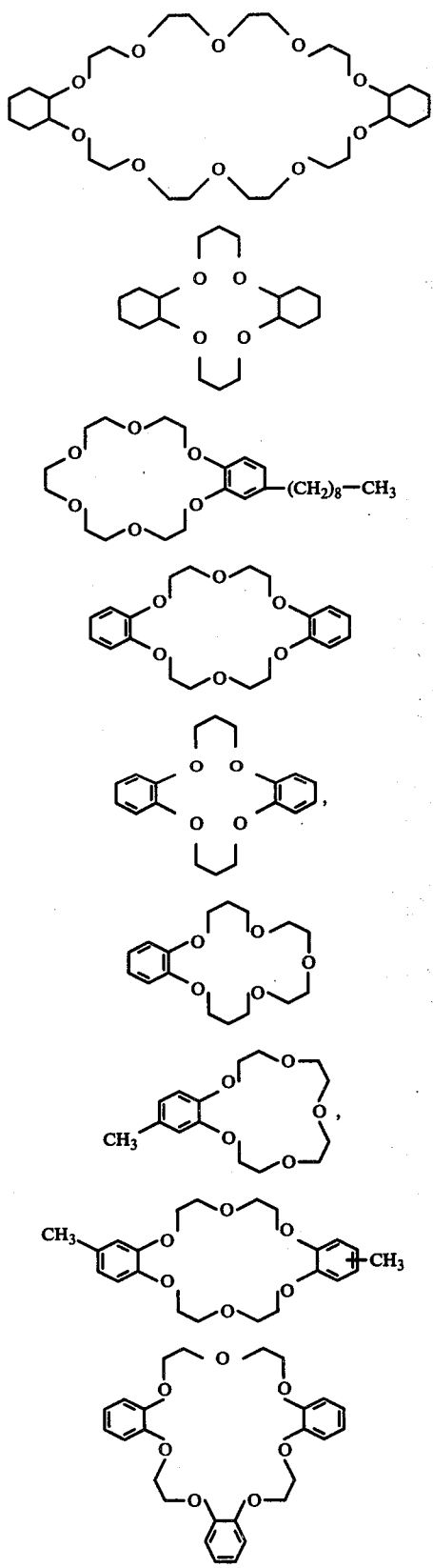

Group II

-continued

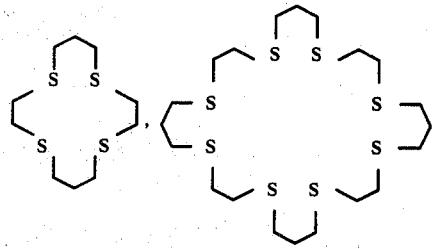

Group III

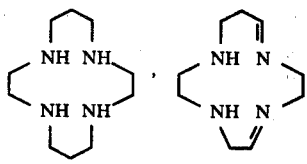

Group IV

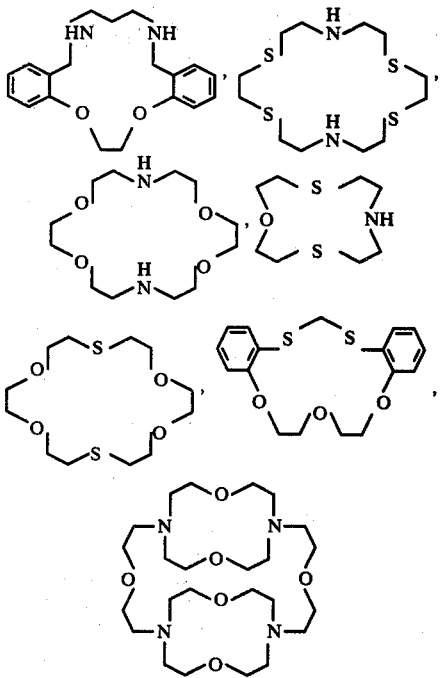

Group V

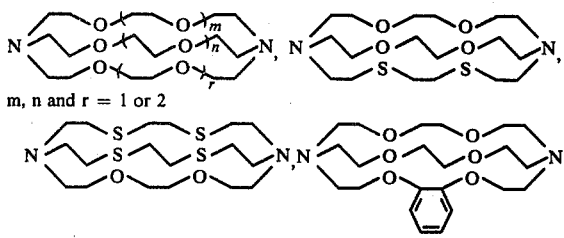

m, n and r = 1 or 2

The preparation and the study of the different types of macrocyclic compounds, such as those mentioned above, has been the subject of numerous publications. In particular the works of Pedersen (*J.A.C.S.*, 89, 7017-1967, 89, 2495-19067), Vögtle et al. (*Chemiker Zeitung*, 97 (11) 1973 p. 600-61°), Ditrich, Lehn et al. (*Tetrahedron Letters*, 15, pp. 1225-1228 — 1973, *Tetrahedron*, 29 pp. 1629-1658 — 1973), and Levêque and Rosset (*Analusis*, 2 p. 218 — 1973), and Christensen et al. (*Science*, 174 no 4008 — 1971), the disclosures of each of which are hereby incorporated by reference; each teach the synthesis of compounds which are useful for the purpose of the invention.

The symbols "$R_1$" and "$R_2$" of the polysiloxanes of the formula (A) preferably represent radicals chosen from among the alkyl radicals having 1 to 4 carbon atoms, particularly the methyl radical; alkenyl radicals having up to 8 carbon atoms, in particular the vinyl radical; a cycloaliphatic radical, preferably cycloalkyl of up to 10 carbon atoms, especially the cyclohexyl radical; or an aryl radical having from 6 to 10 carbon atoms, in particular a phenyl radical.

The radicals represented by the symbol $OR_3$ can especially be selected from among the methoxy, ethoxy or propoxy radicals.

It must be understood that, in the same cyclic siloxane, the various symbols "$R_1$" and "$R_2$" can likewise represent different radicals, for example methyl and ethyl or methyl and phenyl radicals.

By way of illustration of the siloxanes of the formula (A), there may particularly be mentioned: octamethylcyclotetrasiloxane, tetramethyltetravinylcyclotetrasiloxane, octaphenylcyclotetrasiloxane, pentamethylpentaethylcyclopentasiloxane and 1,1-hexamethyldiphenyl-cyclotetrasiloxane.

These cyclic siloxanes or mixture of siloxanes represent at least about 50% by weight, and preferably more than about 70% by weight, of the polysiloxanes subjected to polymerization. The remainder may consist of linear polysiloxanes of the formula (B)

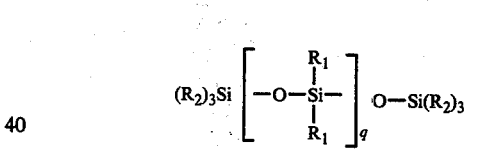

in which "q" represents an integer ranging from 1 to about 100, and the different symbols "$R_1$" and "$R_2$" have the meaning given above, it being possible for the radicals bonded to the same silicon atom to be different from one another.

The following products constitute examples of such siloxanes of the formula (B): divinyltetramethyldisiloxane, tetravinyldimethyldisiloxane, α,ω-dihydroxydimethylpolysiloxanes, α,ω-dialkoxy-dimethylpolysiloxanes, tetraphenyldisiloxane-diol and tetradecamethylhexasiloxane.

The invention further includes incorporating silanes such as for example, methyltriethoxysilane, vinyltri(methoxyethoxy) silane, phenyltriethoxysilane, vinylmethyldiethoxysilane, diphenyldimethoxysilane, or tetraethoxysilane, or of a cyclic trisiloxane such as hexamethylcyclotrisiloxane, with the cyclic siloxane of the formula (A) and, optionally, with the linear siloxane of the formula (B), in small amounts, representing for example up to 10% by weight of the siloxane (A) or of the mixture A + B.

In the process according to the invention, it is possible to use various alkaline catalysts, which are used for the polymerization of low molecular weight polysiloxanes (See for example NOLL, *Chemistry and Technology of Silicones*, p. 227). Catalysts which may be used are alkali metal hydroxides, in particular lithium hydroxide, potassium hydroxide, sodium hydroxide and cesium hydroxide; alkali metal silanolates, in particular potassium or sodium silanolates; alkali metal alkoxides, and alkali metal siliconates, especially potassium dimethylsiliconate, may be used.

Among other advantages, the process according to the invention has is the requirement that only a very small quantity of alkaline catalyst (for a given rate of polymerization), be used in association with the macrocyclic compound. Thus, in order to carry out this process, it is possible to use quantities of alkaline catalyst which are as low as between about 0.005 and about 1 millimol, and preferably about 0.01 to about 0.5 millimol, per 100 g of siloxane, and from about 0.05 to about 5 mols and, preferably about 0.1 to about 2 mols, of macrocyclic compound per mol of alkaline catalyst. The polymerization temperature can be within the usual temperature range, i.e., generally between about 25° and 200° C. Under these conditions, the disclosed technique makes it possible to substantially reduce the duration of the polymerization reaction, for a given degree of conversion. By using the present process, under the right circumstances, reductions in time relative to polymerizations carried out with the alkaline catalysts alone, can amount to 50 to 75%.

The technique described above is of considerable interest in both the continuous and batch polymerization of siloxanes on an industrial scale. The macrocyclic compound does not break down and does not alter the mechanical properties and the heat-stability of the polymerized organosilicon products. Thus, organosilicon rubbers prepared by following the process according to the invention and having, for example, methyl, ethyl, vinyl and phenyl groups bonded to the silicon atom, when mixed with the usual fillers and then cross-linked using a peroxide, give elastomers having excellent mechanical properties.

In order to further illustrate the present invention and the advantages thereof, the following specific examples are given, it being understood that same are intended only as illustrative and in nowise limitative.

EXAMPLES 1 to 3

1,040 g of octamethylcyclotetrasiloxane and the macrocyclic compound ("crown-ether" identified below) were charged into a 2 liter stainless steel reactor. The temperature of the mixture was raised progressively up to 120° C. The mixture was stirred and a stream of nitrogen was passed through the reactor (flow-rate 50 l/hour). The temperature was further increased to 173° C. while the siloxane, carried by the stream of nitrogen, was condensed; when 42 cm³ of distillate had been collected, [40 g of octamethylcyclotetrasiloxane] bubbling of the nitrogen was stopped and the temperature of the mixture was lowered to 160° C. Tetradecamethylhexasiloxane (hereinafter termed "blocking agent"), 1,3,5,7-tetramethyl-1,3,5,7-tetravinyl-cyclotetrasiloxane (hereinafter termed vinylated fluid) and subsequently the alkaline catalyst/KOH, which was in the form of potassium dimethylsiliconate, were then introduced into the reactor.

When the degree of conversion into high boiling point compounds (products which do not distil during the devolatilization process) attained the desired value, the polymerization was stopped by bubbling $CO_2$ through the mixture at a flow rate of 40 l/hour for 5 minutes and then cooled to 25° C.

Thereafter, the polymer mixture was neutralized, as is conventional, by using silylated phosphoric acid as the neutralizing agent. Finally, remaining monomers, which were present in equilibrium with the polymers, together with light cyclosiloxanes were removed by heating at a temperature of 180° C. while under a reduced pressure of 0.5 mm of mercury to purify the polysiloxane rubber.

In each of these examples, the product of the following formula was used as the crown-ether:

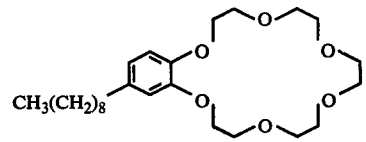

(chemical name: 2.3-(3'-nonyl-benzo)-1,4,7,10,13,16-hexaoxacyclooctadecane, also called 3'-nonyl-benzo-18-crown-6).

By way of comparison, a control test using no crown-ether was also run.

The quantities of reagents used and the results obtained will be indicated in the table which follows:

| TEST | 1 | 2 | 3 | CONTROL |
|---|---|---|---|---|
| Blocking agent (g) | 1.12 | 1.12 | 1.05 | 1.1 |
| Vinylated fluid (g) | 2.54 | 2.4 | 2.44 | 2.4 |
| KOH (mg) | 8 | 8 | 8 | 10 |
| Crown-ether (mg) | 84 | 67 | 48 | — |
| Mols of crown-ether | 1.22 | 0.97 | 0.7 | — |
| Mols of KOH | | | | |
| Polymerization temperature | 160° C. | 160° C. | 160° C. | 160° C. |
| Duration of the polymerization | ½ Hour | ½ Hour | ½ Hour | 2½ Hours |
| and degree of conversion (DC) | 85.6% | 87.4% | 88.4% | 80.7%[1] |

[1]After half an hour, the degree of conversion is less than 50%.
[2]The degree of conversion was determined according to the formula $(1 - \frac{P'}{P}) \times 100\%$, P' designating the weight of volatile matter which has distilled during the devolatilization process and P the weight of monomer introduced (octamethylcyclotetrasiloxane). The quantity of alkaline catalyst is expressed in mg of KOH.

EXAMPLE 4

In order to illustrate the properties of the elastomers derived from the rubbers obtained in accordance with the invention, compositions were prepared comprising: 100 g of rubber, 44 g of pyrogenic silica with a high specific surface area (260 m²/g), 0.4 g of iron octoate, 0.85 g of diphenyldimethoxysilane, 0.85 g of an α,ω-dihydroxy-dimethylpolysiloxamic oil of viscosity 50 cp. at 25° C., and 0.9 g of 2,4-dichloro-benzoyl peroxide.

"Vulcanization" of this composition was carried out by heating for 8 minutes at 110° C. under a pressure of 65 bars.

The table which follows sets forth the various measurements which were carried out on samples cut from the above elastomers.

| | | | TEST RUBBER | | |
|---|---|---|---|---|---|
| | | | 1 | 3 | CONTROL |
| | SHORE A hardness | (a) | 59 | 59 | 61 |
| After recuring for 16 hours at 250° C. | Tensile strength at break (Kg/cm²) | (b) | 84 | 79.5 | 83 |
| | Elongation at break (%) | (b) | 290 | 285 | 300 |
| | Tear strength | (c) | 19.5 | 18.7 | 21 |

-continued

|  |  |  | TEST RUBBER | | |
|---|---|---|---|---|---|
|  |  |  | 1 | 3 | CONTROL |
|  | (Kg/cm²) Compression set | (d) | 28 | 30 | 23 |
| After recurring for 7 days at 250° C. | SHORE A hardness | (a) | 67 | 67 | 67 |
|  | Tensile strength at break (Kg/cm²) |  | 54 | not | 57 |
|  | Elongation at break (%) | (b) | 160 | measured | 164 |
|  | Tear strength (Kg/cm) | (c) | 12 |  | 11 |

(a) standard ASTM specification D 2,240
(b) standard ASTM specification D 412
(c) standard ASTM specification D 624
(d) standard ASTM specification D 395 - 70 hours/150° C/25%

EXAMPLES 5 and 6

The tests of Examples 1 to 3 were repeated. However, instead of using octamethylcyclotetrasiloxane ($Me_2SiO)_4$ alone, the following combinations of silanes having Formula (A) were used:
5. a mixture of octamethylcyclotetrasiloxane and octaphenylcyclotetrasiloxane ($\phi_2 SiO)_4$.
6. a mixture of octamethylcyclotetrasiloxane and diphenylhexamethylcyclotetrasiloxane ($\phi_2 SiO$)($Me_2SiO)_3$.

The operating conditions and the results are shown in the following table:

| Test | 5 | CONTROL | 6 | CONTROL |
|---|---|---|---|---|
| ($Me_2 SiO)_4$ (g) | 860 | 850 | 570 | 570 |
| ($\phi_2 SiO)_4$ (g) | 150 | 150 | — | — |
| ($\phi_2 SiO$)($Me_2 SiO)_3$ (g) | — | — | 430 | 430 |
| Blocking agent (g) | 1.04 | 0.9 | 0.39 | 0.39 |
| Vinylated fluid (g) | 2.8 | 2.8 | 2.3 | 2.34 |
| KOH (mg) | 14 | 20 | 9.6 | 20 |
| Crown-ether (mg) | 143 | — | 60 | — |
| Mols of crown-ether / mols of KOH | 1.2 | — | 0.73 | — |
| Polymerization temperature | 160° C. | 160° C. | 160° C. | 160° C. |
| Duration of polymerization (hours) | 1.5 | 3 | 1.5 | 3 |
| Degree of conversion % | 89 | 85 | 87 | 89.5 |

EXAMPLES 7 and 8

The test of Example 1 was repeated, operating at a lower polymerization temperature:

| TEST | 7 | 8 |
|---|---|---|
| (For 1,000 g of octamethylcyclotetrasiloxane) |  |  |
| Blocking agent (g) | 1.34 | 1.36 |
| Vinylated fluid (g) | 2.53 | 2.35 |
| KOH (mg) | 10 | 12 |
| Crown-ether (mg) | 86 | 190 |
| Mols of crown-ether / mols of KOH | 1 | 1.8 |
| Polymerization temperature | 130 | 100 |
| Duration of polymerization | 2 hours | 1 hour 30 minutes |
| Degree of conversion | 89.6 (x) | 71 (xx) |

(x)using no crown-ether, a degree of conversion of 88% was obtained over a period of 6 hours 45 minutes.
(xx)using no crown-ether, a degree of conversion of 88% was obtained over a period of 45 hours.

EXAMPLES 9 and 10

The test of Example 1 was repeated, using the product of the following formula as the crown-ether:

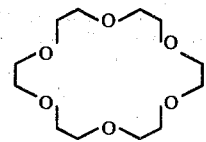

The following table illustrates the operating conditions and the results achieved:

|  | Example 9 | Example 10 |
|---|---|---|
| Octamethylcyclotetrasiloxane | 1,000 g | 1,000 g |
| Crown-ether (mg) | 5.2 | 42.1 |
| Blocking agent (g) | 1.150 | 1.193 |
| Vinylated fluid (g) | 2.600 | 2.520 |
| Catalyst (KOH) (mg) | 9 | 7.4 |
| Mols of crown-ether / mols of KOH | 0.123 | 1.2 |
| Temperature | 160° C. | 160° C. |
| Duration of polymerization and degree of conversion | ½ Hour 87.8 | ½ Hour 86.4 |

EXAMPLES 11 to 14

The test of example 1 was repeated, using the product of the following formula as the macrocyclic ether:

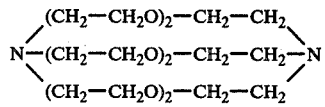

(4,7,13,16,21,24-hexaoxa-1,10-diaza bicyclo (8,8,8) hexacosane.

The following table illustrates the operating conditions and the results achieved:

|  | EX. 11 | EX. 12 | EX. 13 | EX. 14 |
|---|---|---|---|---|
| Octamethylcyclotetrasiloxane | 1,000 g | 1,000 g | 1,000 g | 1,000 g |
| Macrocyclic ether (mg) | 6.9 | 4.6 | 12.7 | 53.2 |
| Blocking agent (g) | 1.240 | 1.192 | 1.160 | 1.172 |
| Vinylated fluid (g) | 2.410 | 2.630 | 2.480 | 2.520 |
| Catalyst (KOH) (mg) | 11.1 | 8.6 | 11.3 | 8.8 |
| Mols of macrocyclic ether / Mols of KOH | 0.092 | 0.12 | 9.167 | 0.9 |
| Temperature | 160° C | 160° C | 160° C | 160° C |
| Duration of polymerization and degree of conversion | 10mn 85.5 | 20mn 87.4 | 10mn 86.7 | 15mn 88.1 |

While the invention has been described and illustrated with reference to certain preferred embodiments thereof, those skilled in the art will appreciate that various changes, modifications and substitutions therein can be made without departing from the spirit of the invention. It is intented, therefore, that the invention be limited only by the scope of the claims which follow.

What is claimed is:

1. A process for the preparation of high molecular weight organopolysiloxanes comprising bulk polymerization of siloxanes which comprise at least 50% by weight of the cyclic siloxanes of the formula:

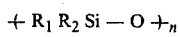

wherein "n" represents an integer which is at least 4, "R₁" is a hydrocarbon radical containing from 1 to 12 carbon atoms, which may be unsubstituted or substituted by one or more members selected from the group consisting of halogen, amino and cyano, and "R₂" is either the "R₁" radical or —OR₃, wherein "R₃" is either hydrogen or the "R₁" radical, in the presence of:
  (a) about 0.005 to about 1 millimol of an alkaline catalyst per 100 g of the siloxane employed; and
  (b) from 0.05 to 5 mols, per mol of alkaline catalyst, of a monocyclic or polycyclic heterocycle compound or mixture of heterocycle compounds, comprising at least 3 heterocycle members selected from the groups —O—, —S—,

or —NH—, and having from 9 to 60 carbon atoms, the heterocycle members being interconnected via hydrocarbon groups comprising at least two carbon atoms.

2. The process as defined by claim 1, wherein the component (b) is a cyclic polyether of the formula:

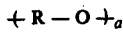

in which "a" is a number from 3 to 20, and "R" represents (1) a —CH₂—CH₂— or —CH₂—CH₂—CH₂— radical or (2) a radical selected from the group consisting of the

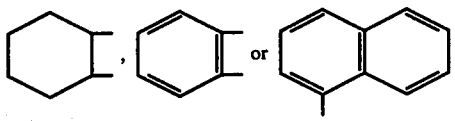

radicals, the number of ─ R ─ O ─ units in which "R" represents a radical (2) being 1 or 2.

3. The process as defined by claim 2, wherein the component (b) radicals (2) are alkyl substituted, said alkyl having up to 12 carbon atoms.

4. The process as defined by claim 1, wherein the component (b) is a monocyclic polythioether of the formula:

in which "R" represents (1) a —CH₂—CH₂— or —CH₂—CH₂—CH₂— radical or (2) a radical selected from the group consisting of

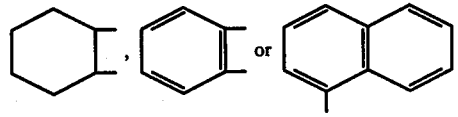

radicals, the number of ─ R ─ S ─ units in which "R" represents a radical (2) being 1 or 2, and "a" is a number from 3 to 20.

5. The process as defined by claim 4, wherein the component (b) radicals (2) are alkyl substituted, said alkyl having up to 12 carbons.

6. The process as defined by claim 1, wherein the component (b) is a monocyclic polyamine containing from 4 to 8 —N— atoms or —NH— groups, interconnected via —CH₂—CH₂—, —CH₂—CH₂—CH₂— or —CH₂—CH₂—CH = linkages.

7. The process as defined by claim 1, wherein the component (b) is a monocyclic or polycyclic compound containing at least 2 different types of heterocycle members selected from the group consisting of —O—, —S— and —NH—, the said heterocycle members being interconnected by —R— radicals in which "R" represents (1) a —CH₂—CH₂— or —CH₂—CH₂—CH₂— radical or (2) a radical selected from the group consisting of

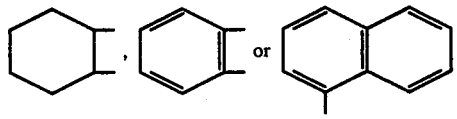

radicals, the total number of heterocycle members being no more than 8.

8. The process as defined by claim 7, wherein the component (b) radicals (2) are alkyl substituted, said alkyl having up to 12 carbons.

9. The process as defined by claim 1, wherein the component (b) comprises a nitrogen-containing bicyclic compound having the formula:

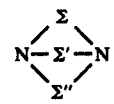

wherein Σ, Σ', Σ'', which may be identical or different, are ─R' — T —ₚR' ─ groups, and wherein "T" represents —O—, —S— or a valence bond, "p" is equal to 1, 2 or b 3, and "R'" represents a —CH₂—CH₂— group or the

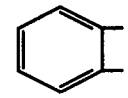

radical, with the proviso that in only one of the Σ, Σ' and Σ'' linkages may T be a valence bond, and with the further proviso that but a single R' in either one or two of the Σ, Σ' and Σ'' linkages may be

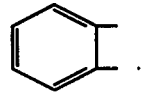

10. The process as defined by claim 9, wherein the symbol "T" represents a valence bond in one of the Σ, Σ' and Σ'' linkages.

11. The process as defined by claim 9, wherein a single R' is

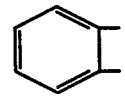

in either one or two of the Σ, Σ' and Σ'' linkages.

12. The process as defined by claim 1, wherein the alkaline catalyst is selected from the group consisting of alkali metal hydroxides, alkali metal silanolates, alkali metal alkoxides and the alkali metal siliconates.

13. The process as defined by claim 1, wherein the cyclic siloxane comprises one or more of the following: octamethylcyclotetrasiloxane, tetramethyltetravinylcyclotetrasiloxane, octophenylcyclotetrasiloxane, pentamethylpentaethylcyclopentasiloxane and hexamethyldiphenylcyclotetrasiloxane.

14. The process as defined by claim 1, wherein the siloxanes subjected to polymerization comprise a mixture of the cyclic siloxane, and up to 50% by weight of a linear polysiloxane of the formula:

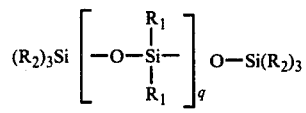

in which "q" represents an integer between 1 and about 100, "$R_1$" is a hydrocarbon radical containing from 1 to 12 carbon atoms, which may be unsubstituted or substituted by one or more members selected from the group consisting of halogen, amino and cyano, and "$R_2$" is either the "$R_1$" radical or $-OR_3$, wherein "$R_3$" is either hydrogen or the "$R_1$" radical, and wherein the $R_1$'s and the $R_2$'s bonded to the same silicon atom may be the same or different.

15. The process as defined by claim 1, comprising including in the polymerization recipe up to 10% by weight of the cyclic siloxanes, of a member selected from the group consisting of a silane and a cyclic trisiloxane.

16. The process as defined by claim 14, comprising including in the polymerization recipe up to 10% by weight of the cyclic siloxanes, of a member selected from the group consisting of a silane and a cyclic trisiloxane.

17. The process as defined by claim 1, wherein the quantity of alkaline catalyst (a) used is between about 0.01 and about 0.5 millimol per 100 g of siloxane and the quantity of heterocycle (b) is between about 0.1 and about 2 mols per mol of alkaline catalyst.

18. The process as defined by claim 1, wherein the process is a batch process.

19. The process as defined by claim 1, wherein the process is a continuous process.

20. The process as defined by claim 1, wherein the polymerization recipe comprises at least 70% by weight of the cyclic siloxanes.

21. The process as defined by claim 1, wherein $R_1$ is a member selected from the group consisting of alkyl having from 1 to 4 carbon atoms, alkenyl having up to 8 carbon atoms, cycloalkyl having up to 10 carbon atoms, and aryl having from 6 to 10 carbon atoms.

22. The process as defined by claim 1, wherein the quantity of heterocycle component (b) is between 0.05 and 0.97 mols per mol of alkaline catalyst.

* * * * *

REEXAMINATION CERTIFICATE (748th)

United States Patent [19]

Bargain et al.

[11] B1 4,138,543

[45] Certificate Issued Aug. 18, 1987

[54] POLYMERIZATION OF ORGANOPOLYSILOXANES

[75] Inventors: Michel Bargain, Lyons; Claude Millet, Saint-Priest, both of France

[73] Assignee: Rhone-Poulenc Industries, Paris, France

Reexamination Request:
No. 90/001,079, Sep. 4, 1986

Reexamination Certificate for:
Patent No.: 4,138,543
Issued: Feb. 6, 1979
Appl. No.: 800,391
Filed: May 25, 1977

[30] Foreign Application Priority Data

May 31, 1976 [FR] France .................. 76 17170

[51] Int. Cl.⁴ .................... C08G 77/04

[52] U.S. Cl. .................... 528/14; 528/20; 528/21; 528/23; 528/37; 528/32; 528/42; 528/43; 556/462

[58] Field of Search .................... 528/37, 23, 21, 20, 528/14, 32, 42, 43; 556/462

[56] References Cited

U.S. PATENT DOCUMENTS 4,157,337 6/1979 Evans .................. 260/448.2 E

OTHER PUBLICATIONS

Uncertified copy of specification of 574,333, filed May 5, 1975.
Pedersen, C. J., JACS; 89, 7017, (1967).
Vogtle, V. F. et al, Chemiker Zeitung, 97,601, (1973).
Christensen, J. J. et al, Science 174, 459, (1971).

*Primary Examiner*—Melvyn I. Marquis

[57] ABSTRACT

Organopolysiloxanes are polymerized in the presence of an alkaline catalyst and a complex oxygen, sulfur or nitrogen heterocyclic compound.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4-6 and 9-11 is confirmed.

Claims 1-3, 7, 8 and 12-22 are cancelled.

* * * * *